Ῑ

US 7,600,884 B2
Oct. 13, 2009

(12) United States Patent
Vitulli et al.

(10) Patent No.: US 7,600,884 B2
(45) Date of Patent: Oct. 13, 2009

(54) MOTION ACTIVATED AND SELECTIVE LIGHT CIRCUIT

(75) Inventors: Pardo Vitulli, Riviere-des-Prairies (CA); Pardo Dino Vitulli, Laval (CA)

(73) Assignee: Rallye Footwear Inc., Montreal, Quebec (CA)

( * ) Notice: Subject to any disclaimer, the term of this patent is extended or adjusted under 35 U.S.C. 154(b) by 578 days.

(21) Appl. No.: 11/511,319

(22) Filed: Aug. 29, 2006

(65) Prior Publication Data

US 2007/0285919 A1 Dec. 13, 2007

(30) Foreign Application Priority Data

Jun. 7, 2006 (CA) .................................... 2549686

(51) Int. Cl.
*F21V 21/08* (2006.01)
(52) U.S. Cl. ..................... 362/103; 362/108; 362/800; 36/137; 315/200 A
(58) Field of Classification Search ................ 362/103, 362/105, 106, 108, 800; 36/136, 137, 139; 315/200 A, 323, 360
See application file for complete search history.

(56) References Cited

U.S. PATENT DOCUMENTS

| | | | |
|---|---|---|---|
| 6,789,913 B2 * | 9/2004 | Wei | 362/103 |
| 7,067,986 B2 * | 6/2006 | Wong et al. | 315/200 A |
| 7,207,688 B2 * | 4/2007 | Yuen et al. | 362/103 |
| 2005/0183294 A1 * | 8/2005 | Guzman | 36/137 |
| 2006/0174521 A1 * | 8/2006 | Lee | 36/137 |

FOREIGN PATENT DOCUMENTS

| | | |
|---|---|---|
| CA | 2124107 | 8/1995 |
| WO | WO 98/39983 | 9/1998 |

\* cited by examiner

*Primary Examiner*—Douglas W Owens
*Assistant Examiner*—Ephrem Alemu
(74) *Attorney, Agent, or Firm*—Ogilvy Renault LLP

(57) ABSTRACT

A motion activated light circuit is comprised of a motion activatable switch which effects switch closures upon displacement thereof for connecting a supply voltage to a pulse generator circuit which generates a predetermined pulse length to provide a control signal at an output thereof. An oscillator circuit is coupled to the control signal of the pulse generator circuit to produce light actuating pulses to feed one of two or more independent light circuits through a light source selection switch. The light source selection switch is conditioned by a sensor which senses ambient light intensity whereby the light actuating pulses are directed to a selected one of the two or more independent light circuits to cause the selected light circuit to generate light pulses.

14 Claims, 3 Drawing Sheets

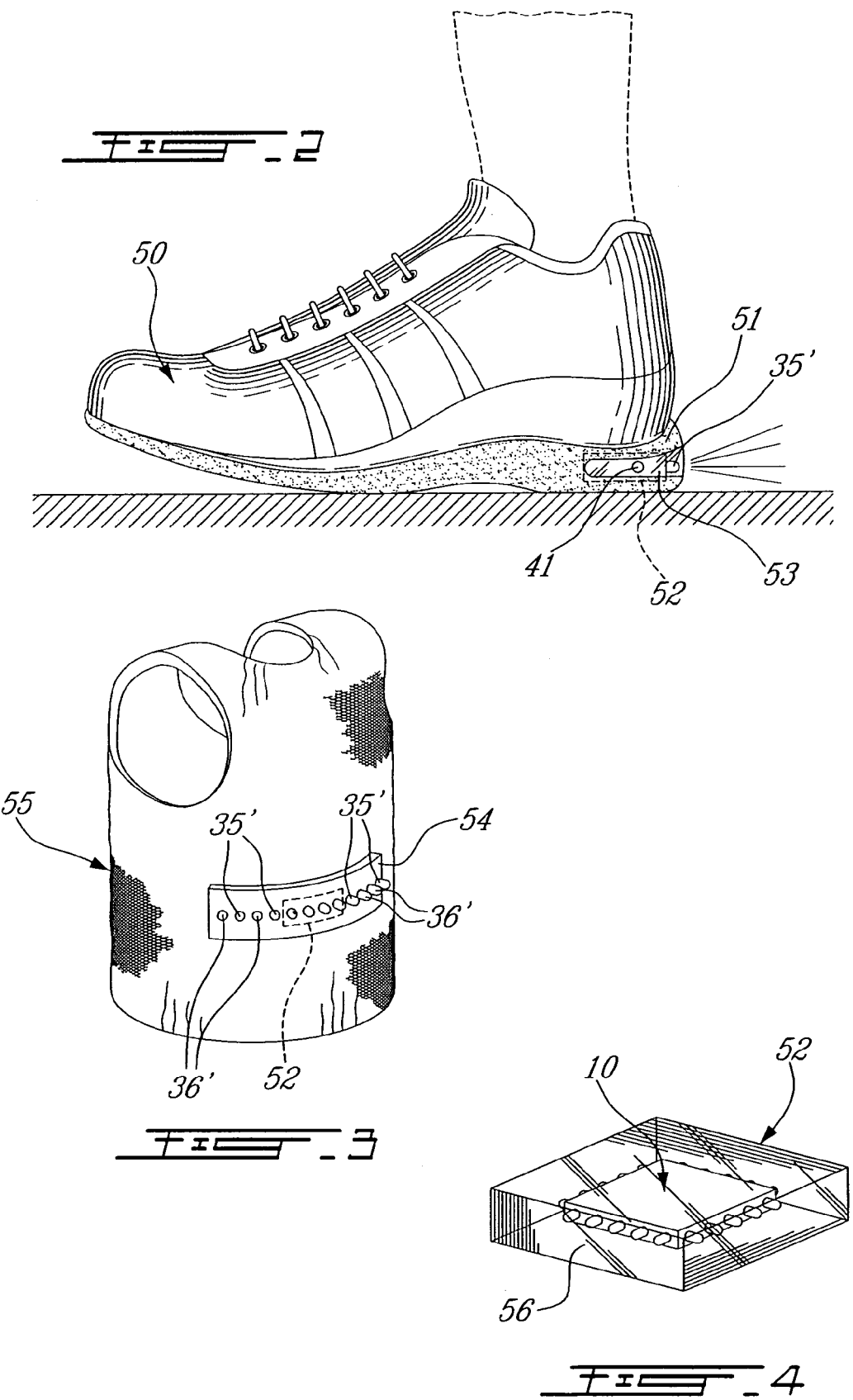

MOTION ACTIVATED AND SELECTIVE LIGHT CIRCUIT

TECHNICAL FIELD

The present invention relates to a motion activated light circuit incorporating a light source selection switch and a sensor to actuate selected ones of independent light circuits depending on ambient light intensity. Particularly, but not exclusively, the motion activated light circuit is for use in the heel of a shoe provided with a transparent portion whereby to emit light from the heel upon motion of the shoe.

BACKGROUND ART

In PCT Publication WO 98/39983, there is described a sequential flashing circuit for use in an article of footwear and using LED's to generate light pulses which are visible from the rear of the heel of a shoe. The LED's are supplied voltage by a motion activatable switch which changes between an open and closed position by displacement of the shoe. The LED's are illuminated for a period of time in response to a change of the switch from this closed to open position. The motion activated switch is a spring element carrying a switch contact. The spring element is sensitive to movement to cause switch closures.

Canadian Patent 2,124,107 also describes a motion activated light module which is disposed in the heel of a shoe and which operates on the same principle as the above-referenced PCT Publication and wherein a spring is sensitive to impacts or displacement whereby to effect a battery connection. The circuit as herein described is packaged in a module which is incorporated in a cavity formed in the heel of a shoe. Light emitting diodes project from this module and are visible through a transparent portion of the heel of a shoe.

SUMMARY OF INVENTION

It is a feature of the present invention to provide a motion activated light circuit of the above prior art general type, but wherein the circuit is selective to actuate specific light sources of at least two independent light sources and dependent on the ambient light intensity in the environment of the circuit.

Another feature of the present invention is to provide a motion activated light circuit capable of emitting light intensities of different colors dependent on the ambient light intensity in the environment of the circuit whereby the light is visible during daylight or at night.

According to the above features, from a broad aspect, the present invention provides a motion activated light source circuit comprising a motion activatable switch means responsive to displacement of the switch means effecting switch closures for connecting a supply voltage to a pulse generator circuit. The pulse generator circuit generates a predetermined pulse length to produce a control signal at an output thereof. An oscillator circuit is coupled to the control signal of the pulse generator circuit to produce light actuating pulses to two or more independent light circuits through a light source selection switch. The light source selection switch is conditioned by a sensor which senses ambient light intensity whereby the light actuating pulses are directed to a selected one of the two or more independent light circuits to cause the selected light circuit to generate light pulses.

BRIEF DESCRIPTION OF DRAWINGS

A preferred embodiment of the present invention will now be described with reference to the accompanying drawings in which:

FIG. 2 is a perspective view showing an application of the motion activated and selective light circuit of the present invention as encapsulated in a heel of a shoe;

FIG. 3 is a perspective view showing a different application of the motion activated and selective light circuit of the present invention as incorporated into an article of apparel; and FIG. 4 is a perspective view showing the motion activated and selective light source of the present invention encapsulated in a clear resin module.

DESCRIPTION OF PREFERRED EMBODIMENTS

Figure 1A:
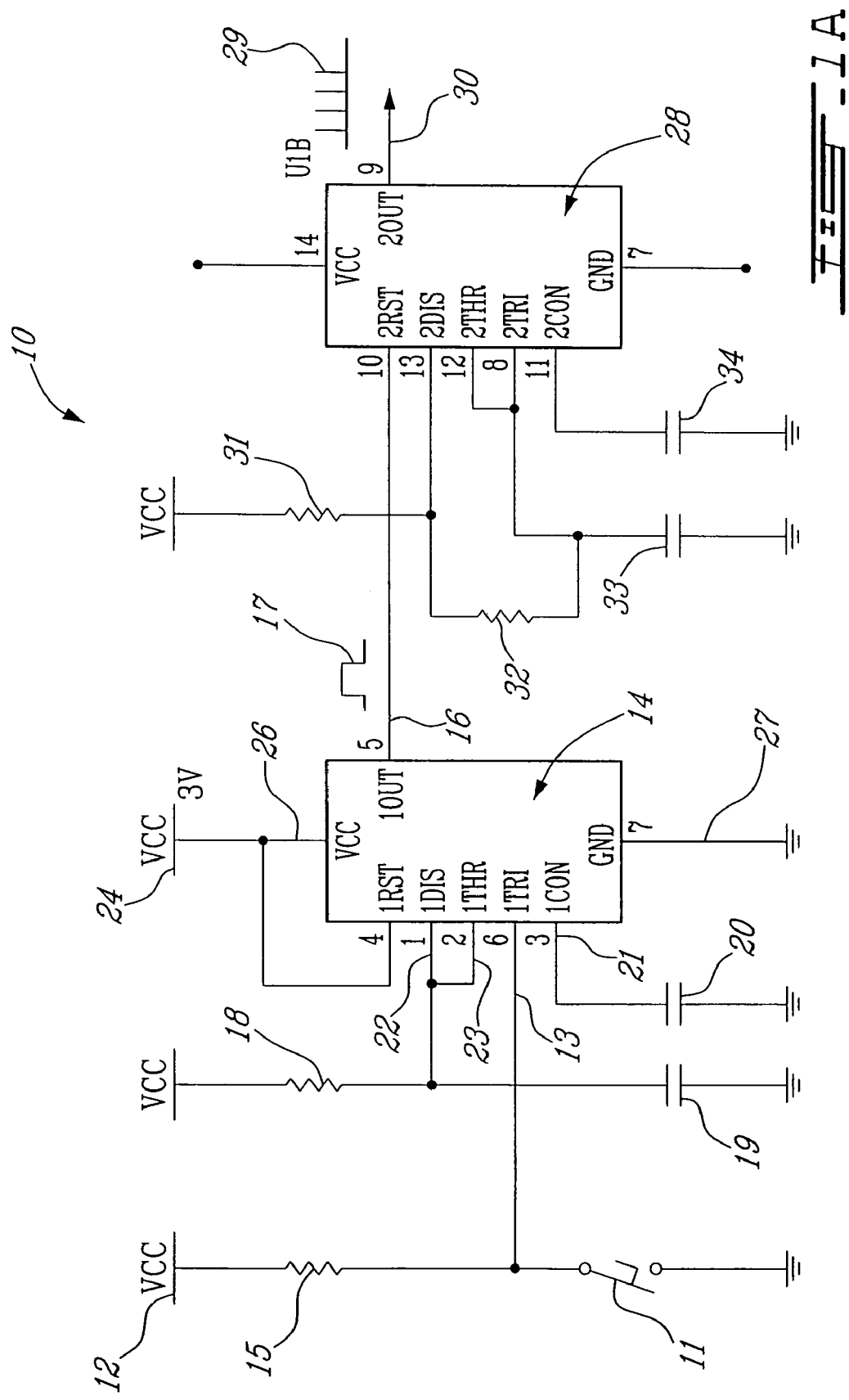
FIG. 1A is a schematic diagram of a first part of the motion activated and selective light circuit of the present invention.
Figure 1B:
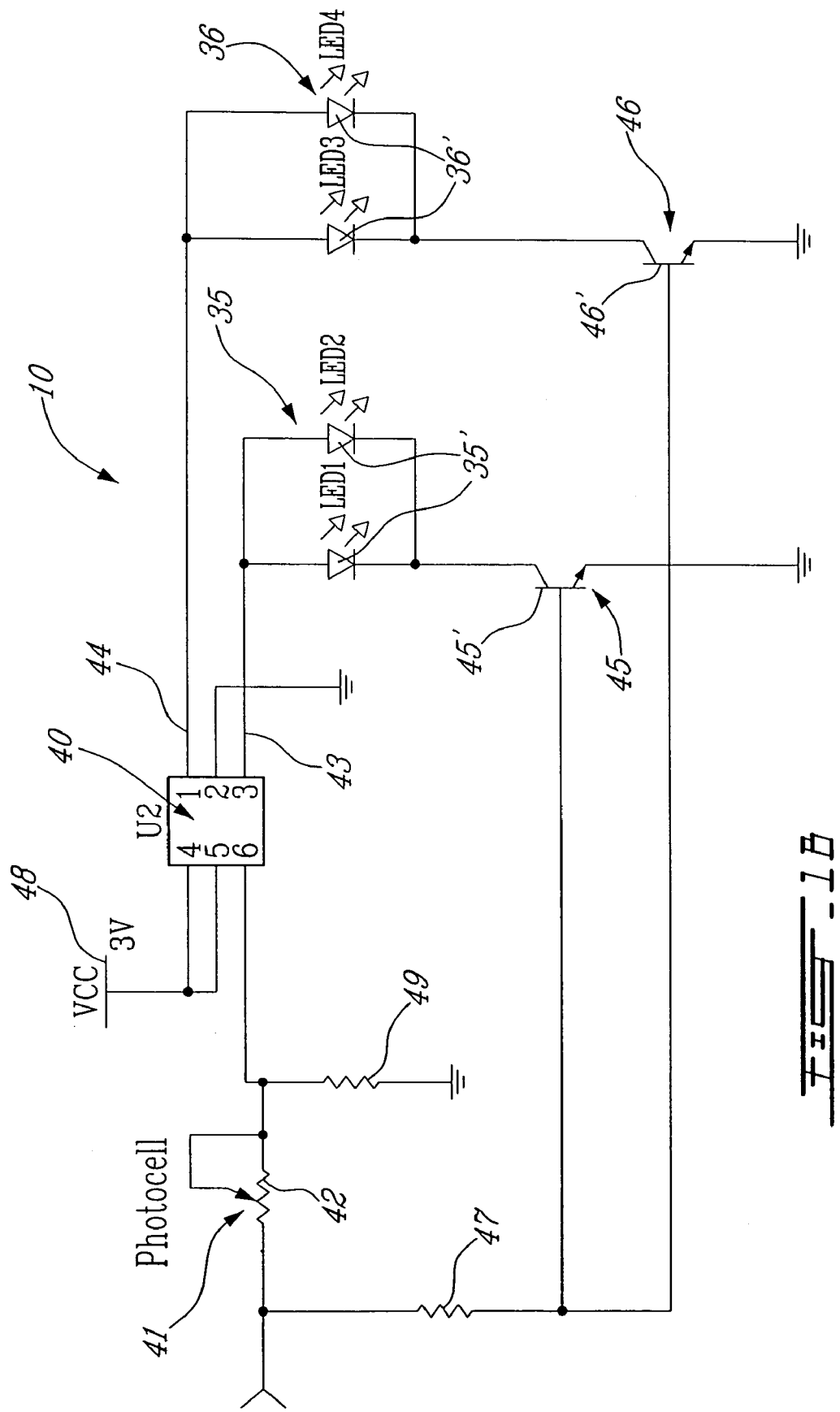
FIG. 1B is a schematic diagram of a second portion thereof.

Referring now to the drawings and more particularly to FIGS. 1A and 1B, there will be described the motion activated and selective light circuit 10 of the present invention. The circuit comprises a motion activatable switch 11 which may be a mercury switch, a spring switch of the type as above-referred to in prior art designs or a pressure contact switch. The switch 11 effects switch closures upon displacement thereof by a motion imparted to the circuit 10. When the switch 11 effects a switch closure, the supply voltage 12 is connected to an input 13 of a pulse generator circuit 14 through the coupling resistance 15 whereby to cause the pulse generator circuit to generate a pulse of predetermined length at an output 16 thereof to produce a control signal as illustrated by reference numeral 17.

The pulse generator 14 is a one-shot monostable integrated circuit which is set active for a predetermined duration which is set by its coupling circuit comprised of resistance 18 and capacitor 19 which forms an RC circuit. The values of the components of the RC circuit set the predetermined duration of the control pulse 17. A further coupling capacitance 20 is connected to an input terminal 21 of the pulse generator 14. The RC circuit comprised of resistance 18 and capacitor 19 are connected to the inputs 22 and 23 of the pulse generator circuit 14. A supply voltage 24 feeds the pulse generator circuit 14 at inputs 25 and 26 of the integrated circuit. A ground connection is provided at terminal 27 of the circuit.

An oscillator circuit 28 is coupled to the output 16 of the pulse generator 14 and thereby receives the control pulse 17 which actuates the oscillator to produce light actuating pulses 29 at its output 30 at a specific duty cycle during its enabled period as determined by the control pulse length. The oscillator circuit 28 is an astable integrated circuit which is also conditioned by an RC circuit comprised of resistances 31 and 32 and capacitor 33 connected to specific ones of its input terminals. A further capacitance 34 is also connected to an input terminal of the integrated circuit and this RC circuit produces the light actuating pulses 29 which sets a flashing period for the LED's or the light circuits, as will be described later.

The light actuating pulses 29 at the output 30 of the oscillator circuit 28 are connected to one of at least two independent light circuits 35 and 36. Each light circuit 35 and 36 comprise one or more light emitting diodes, herein two light emitting diodes 35' for the light circuit 35 and 36' for the light circuit 36. The light actuating pulses 29 are coupled to a light source selection switch 40 which is an analog switch and this switch connects the light actuating pulses 29 to one of the two light circuits 35 and 36 depending on the state of the analog switch. The state of the analog switch is controlled or conditioned by a sensor which is herein constituted by a photo resistor 41 which consists of a variable resistance 42 in a resistive network to provide a control voltage signal to the analog switch 40 to condition the switch to connect the light actuating pulses to a selected one of the two independent light circuits 35 and 36. The sensor 41 senses the ambient light intensity and dependent on this intensity conditions the analog switch to connect to a particular one of the two light sources. The LED's of each group are distinguished from one another by generating light of different colors whereby one of the light circuits, such as 35, will generate white light and the other light circuit 36 will generate red light, whereby one light is more visible during daylight and the other more visible during darkness.

As hereinshown the light circuits 35 and 36 are each connected between a respective output 43 and 44 of the analog switch and a switching component 45 and 46, respectively. As hereinshown the switching components 45 and 46 are switching transistors but these may also be other components such as a gate or an amplifier circuit. These switching components 45 and 46 are rendered conductive by the light actuating pulses whereby to cause the LEDs's to emit flashing light. These pulses provide the bias for the transistors through the analog switch. A coupling resistance 47 is also connected to the base 45' and 46' of switching transistors 45 and 46, respectively. The analog switch 40 is provided with a supply voltage 48 and a coupling resistance 49 at its inputs. It is also pointed out that although the light sources 35 and 36 are hereinshown as being comprises of two light emitting diodes, respectively, multiples of these diodes and associated switching components may be connected in parallel in each of these lighting circuits 35 and 36.

Referring now to FIG. 2, there is shown an article of footwear 50 having incorporated in the heel portion 51 thereof a capsule 52, such as the capsule illustrated in FIG. 4. This capsule 52 can be molded or otherwise retained within a cavity provided in the heel portion 51 and with its LED's such as LED's 35' oriented adjacent a transparent portion 53 of the heel 51 whereby to emit light which is visible from outside the heel. Accordingly, each time motion is imparted to the shoe 50, the motion actuated switch 11 will effect switch closures to cause light actuating pulses to be connected to one of the light circuits 35 and 36 to emit light of a specific color dependent on the ambient light in the environment of the shoe. As shown in FIG. 2, the photosensor 41 is also aligned with the transparent portion 53 of the heel 51.

FIG. 3 illustrates a further application of the motion activated light circuit 10 of the present invention and wherein the module 52 is incorporated in a band 54 secured to a vest 55 for use by a wearer. The vest may be formed of lightweight material which is worn by a jogger person or a person exercising outdoors or a road worker whereby the motion imparted to the band by the displacement of the wearer causes the light emitting diodes 35' and 36' to flash and the color of the flashing light depends on the ambient light conditions in the environment of the wearer person.

FIG. 4 shows a specific embodiment of the module 52 wherein the motion activated light circuit 10 of the present invention is encapsulated. As hereinshown the circuit is encapsulated in a clear resin module 56 which is dimensioned to fit in a cavity of an injection molded part and secured in such cavity by suitable means such as a further injection process or other attachment means.

It is within the ambit of the present invention to cover any obvious modifications of the motion activated and selective light circuit of the present invention and its applications, provided such modifications fall within the scope of the appended claims.

The invention claimed is:

1. A motion activated light circuit comprising a motion activatable switch means responsive to displacement of said switch means effecting switch closures for connecting a supply voltage to a pulse generator circuit generating a predetermined pulse length producing a control signal at an output thereof, an oscillator circuit coupled to control signal of said pulse generator circuit to produce light actuating pulses to two or more independent light circuits through a light source selection switch, said light source selection switch being conditioned by a sensor which senses ambient light intensity whereby said light actuating pulses are directed to a selected one of the two or more independent light circuits to cause said selected light circuits to generate light pulses.

2. A motion activated light circuit as claimed in claim 1 wherein said light source selection switch is an analog switch.

3. A motion activated light circuit as claimed in claim 2 wherein said sensor is a photoresistor consisting of a variable resistance in a resistive network to provide a control voltage signal to said analog switch to condition said analog switch to provide connection of said selected one of said two or more light circuits to said output of said oscillator.

4. A motion activated light circuit as claimed in claim 3 wherein said two or more independent light circuits each contain one or more light emitting diodes, said light emitting diodes of each said light circuits generating visible light, said visible light of said independent light circuits being differentiated from one another by their color.

5. A motion activated light circuit as claimed in claim 4 wherein said diodes of each said light circuits are connected between a respective output of said analog switch and a switching component rendered operative by said light actuating pulses.

6. A motion activated light circuit as claimed in claim 5 wherein said oscillator is constituted by an astable integrated circuit, said astable integrated circuit being conditioned by an RC circuit to set a flashing period of said selected one of said two independent light circuits and a duty cycle of said light actuating pulses.

7. A motion activated light circuit as claimed in claim 5 wherein said switching component is one of a transistor, a gate or an amplifier circuit.

8. A motion activated light circuit as claimed in claim 1 wherein said motion activatable switch means is one of a mercury switch, a spring switch or a pressure contact switch.

9. A motion activated light circuit as claimed in claim 1 wherein said pulse generator circuit is a one-shot monostable integrated circuit set active for a predetermined duration determined by a coupling RC circuit to generate said control signal at said output thereof, said control signal being a control pulse of predetermined duration as set by said RC circuit.

10. A motion activated light circuit as claimed in claim 4 wherein said light source is comprised of multiples of said diodes and associated one of said switching component.

11. An article of footwear incorporating in a heel thereof said motion activated light circuit as claimed in claim 1, said light circuit being incorporated in a module sealed within said heel, said heel having a transparent portion whereby said light pulses are visible.

12. An article of footwear as claimed in claim 11 wherein said sensor in said module is disposed for sensing said ambient light intensity through said transparent portion.

13. An article of apparel incorporating therein said motion activated light circuit as claimed in claim 1.

14. A motion activated light circuit as claimed in claim 1 encapsulated in a clear resin module.

* * * * *